United States Patent
Burns

(10) Patent No.: US 7,174,002 B1
(45) Date of Patent: Feb. 6, 2007

(54) METHOD AND APPARATUS FOR ASCERTAINING THE CAPACITY OF A NETWORK SWITCH

(75) Inventor: Peter Burns, Kanata (CA)

(73) Assignee: Nortel Networks, Ltd, St. Laurent (CA)

( * ) Notice: Subject to any disclaimer, the term of this patent is extended or adjusted under 35 U.S.C. 154(b) by 665 days.

(21) Appl. No.: 10/701,767

(22) Filed: Nov. 5, 2003

(51) Int. Cl.
  *H04M 1/24* (2006.01)
  *H04M 3/08* (2006.01)
  *H04M 3/22* (2006.01)

(52) U.S. Cl. .............. 379/10.02; 379/9; 379/15.01; 379/112.04

(58) Field of Classification Search .......... 379/1.01, 379/9, 10.02, 15.01, 112.01, 112.04, 112.09, 379/133–134, 139
See application file for complete search history.

(56) References Cited

U.S. PATENT DOCUMENTS

| | | | |
|---|---|---|---|
| 3,840,712 A * | 10/1974 | Oberer et al. ............ | 379/11 |
| 5,042,064 A * | 8/1991 | Chung et al. ............ | 379/112.04 |
| 5,359,646 A * | 10/1994 | Johnson et al. .......... | 379/27.02 |
| 5,881,140 A * | 3/1999 | Gerault et al. ............ | 379/137 |
| 5,978,358 A * | 11/1999 | Wang et al. .............. | 370/234 |

* cited by examiner

*Primary Examiner*—Binh K. Tieu
(74) *Attorney, Agent, or Firm*—John C. Gorecki

(57) ABSTRACT

Performance parameters of a switch may be ascertained by observing its behavior during a brief interval of high call volume. This may be achieved by accumulating call messages on a queue before allowing them to be processed together as a group. Without increasing the rate of incident calls, an accumulation of messages is accomplished by altering the amount of time that elapses between transferring the accumulation to a processing queue. In one implementation, test calls are accumulated in call input queue. Ordinarily, these calls are transferred to a second queue for processing every few milliseconds (the transfer period). By increasing the transfer period, an increased number of calls are stored in the call input queue before being transferred to the second queue. This allows a larger number of calls to be processed by the telephone switch in a given cycle and, hence, allows the switch's operation under increased call volumes to be observed.

21 Claims, 5 Drawing Sheets

METHOD AND APPARATUS FOR ASCERTAINING THE CAPACITY OF A NETWORK SWITCH

BACKGROUND

1. Field

This application relates to communication networks and, more particularly, to a method and apparatus for ascertaining the performance of a network switch.

2. Description of the Related Art

Telephone switches are used to connect telephone subscribers to the Public Switched Telephone Network (PSTN). FIG. 1 illustrates an example of how a telephone switch 10 may be deployed in a telephone network. As shown in FIG. 1, telephone subscribers 12 are provided with access to the Public Switched Telephone Network (PSTN) 14 through the switch 10. Subscriber loops 16 having one or more segments 16a, 16b, connect the subscribers to the telephone switch 10.

When a subscriber seeks to make a telephone call, signaling on the subscriber loop indicates to the telephone switch that the telephone switch should establish a connection between the subscriber's subscriber loop and another line leading to the PSTN. Traffic on the PSTN may be handled in any conventional manner, such as by converting the signals from the subscriber loops into optical signals and multiplexing them over an optical transport network. There may be different options associated with the type of telephone call requested by the subscriber, such as to include a call waiting feature on the call, to include special billing provisions such as where the dialed telephone number is a toll free number, etc. Each of these is treated as a separate type of call by the telephone switch. Setting up a call may require a switch to process an origination message as well as many subsequent progress messages. Indeed, a typical call may include 20, 30, or more progress messages in addition to the origination message. The type of call and the number of legs or stages on the network may affect the number and type of progress messages.

Occasionally it is necessary to increase the switching capacity at one or more points in the network to enable the network to handle larger numbers of telephone calls. In selecting a switch for deployment on the network, one quality that is of particular interest is the maximum number of calls a switch can handle in a given period of time. Conventionally, switches have been rated as being able to handle a certain number of kcalls/hour (thousands of calls per hour) although other capacity measurements may be made as well.

The capacity of a telephone switch is the number of calls that it can set up and tear down in a given time period. The average length of the call (holding time) is not generally important since the telephone switch does not need to perform any additional operations on the telephone call once it is set up. The amount of processing time the switch takes to set up and tear down a call is referred to herein as the "Average Working Time" or AWT. A typical AWT for a large switch is in the order of a few milliseconds to 10s of milliseconds. The AWT may depend on the type of call being processed, whether individual call billing or other features are enabled, and several other factors. Generally, the AWT will be calculated as the amount of time the switch must spend processing the origination message and the subsequent processing messages for the call. A "call" as that term is used herein will be used to connote the origination message and subsequent progress messages associated with the origination message.

Unfortunately, it is difficult to predict the AWT for some switches. The AWT varies with call rate because of internal queuing or buffering behavior. For many switches, as the call rate increases, the AWT decreases asymptotically toward a minimum non-zero value. There are other effects too, all of which make it difficult to declare the capacity of a telephone switch without a direct measurement. Ideally, a network operator and network equipment vendor would inject traffic at high rates directly into a switch until it demonstrates (by refusing new calls) that its capacity is reached.

Unfortunately, as the switch design is advanced to handle larger and larger call rates, the equipment required test the switch up to maximum capacity becomes incredibly expensive. For reasons of cost, it is not practical to test every switch configuration at its maximum capacity. Sometimes, test equipment may be installed that generates calls at 10–20% of the maximum capacity. The maximum capacity of such a switch must be estimated by extrapolation from the test results or from data measured on similar switches. Other informed assumptions are also used to refine the capacity estimate. Well known mathematical functions with several parameters are often used to extrapolate the measurements taken under low traffic conditions to obtain an estimation of the switch's AWT at capacity. The parameters are determined by a "best fit" method but have low statistical accuracy at scaling from the low traffic rates to the estimated high traffic rates achievable by the switch. Given the inherent inaccuracies of these methods at extending the results obtained under low traffic experimental conditions, it would be advantageous to have a new method of ascertaining the performance of a network switch using low volume test traffic without requiring extrapolation and few assumptions.

SUMMARY OF THE DISCLOSURE

Accordingly, it would be advantageous to have a method and apparatus for ascertaining the performance of a network switch. According to one embodiment of the invention, the capacity of a switch may be ascertained by processing calls after accumulating them on an input queue without increasing the rate at which test calls are injected. A series of measurements is taken on the switch while processing increased accumulations of calls on the input queue, with the goal of stimulating capacity-like behavior. When a measurement of the minimum AWT is achieved, this relates directly to capacity.

In one specific implementation, discussed in greater detail below, test calls are input to a call input queue, then all calls are periodically transferred to an OP queue (origination/progress queue) for processing every transfer period, for example every several milliseconds. By increasing the transfer period, an increased number of calls are stored in the call input queue before being transferred to the OP queue. This allows a larger number of calls to be processed by the telephone switch after the transfer. If the call processing period is not increased, the larger number of calls causes the switch to operate momentarily as if it were being expected to operate under an increased call volume. The AWT may then be measured and observed as it processes larger and larger numbers of calls. By measuring the declining AWT, as the transfer period is increased, it is possible find the minimum AWT and the maximum capacity of the telephone switch.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As discussed in greater detail below, a method and apparatus for ascertaining the performance of a network switch makes it possible to require the switch to process larger numbers of calls in a given timeframe without requiring a test call generator to be able to generate that larger call rate continuously. According to an embodiment of the invention, a telephone switch may be tested by inputting test calls into the switch at some initial rate from a test call generator. These test calls are stored in an input queue and are read out periodically to one or more queues (referred to herein collectively as an Origination/Progress queue (OP queue)) in batches to be processed. The period of time between reads from the call input queue to the OP queue will be referred to herein as the transfer period. According to an embodiment of the invention, this transfer period may be altered while maintaining the test call input rate to cause the processor to see an apparently larger number of calls for processing during a given processing cycle. Thus, the behavior of the processor under an apparent load may be ascertained without requiring the actual test load to be increased to the same continuous level. A low generation rate of test calls, once accumulated, can to be used to provide a larger apparent load on a network switch. This can be used to test the switch at higher apparent call levels. By observing the switch's behavior at these apparent higher call volumes, the performance of the switch may be measured. For example, by measuring the minimum AWT (the average time needed to process a call on the input queue) after a relatively longer transfer period, it is possible to directly measure the AWT at capacity conditions and hence to directly measure the maximum capacity of the telephone switch.

Figure 1:
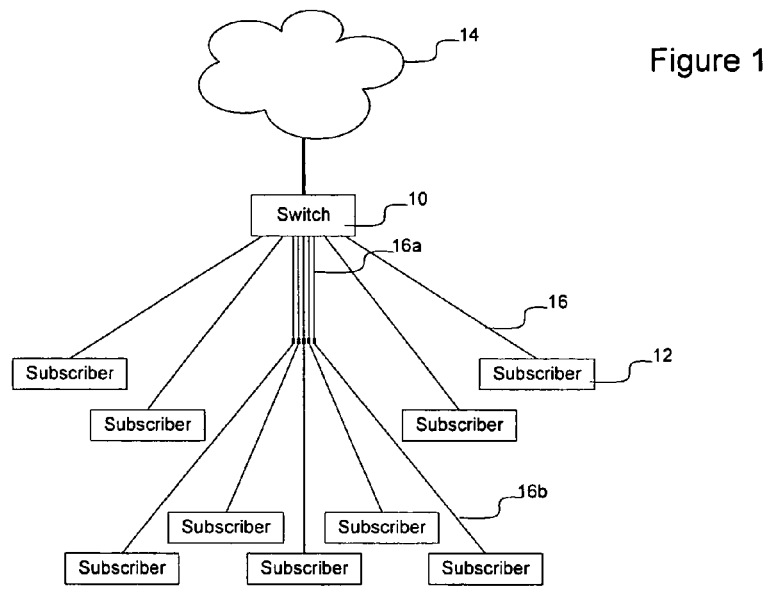
FIG. 1 is a functional block diagram of an example of a telephone network.
Figure 2:
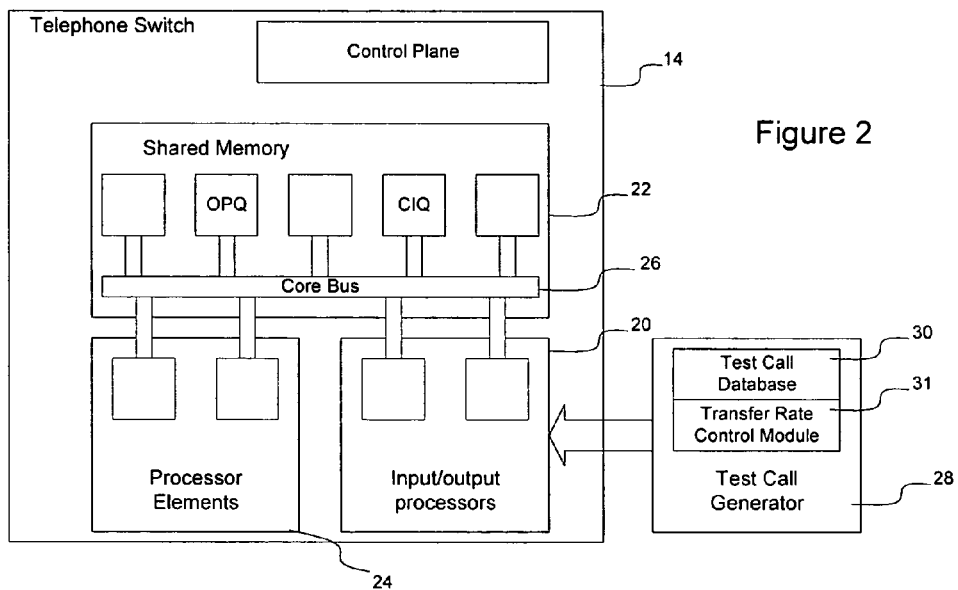
FIG. 2 is a functional block diagram of portions of a telephone switch interfaced to a test call generator according to an embodiment of the invention.

FIG. 2 illustrates one example of a network switch that may be tested according to embodiments of the invention.

As shown in FIG. 2, a switch generally has a switch core, which in this embodiment has three categories of elements: input/output processors 20, shared memory 22, and processor elements 24. The elements are connected by a core bus 26. A given switch may have multiples of each element and redundant elements to enable it to have spare capacity that may be used in the event of a fault on one or more of the elements. Numerous other switch architectures may be used as well, and the invention is not limited to this particular telephone switch architecture.

When the performance of a switch is to be tested, the switch may be hooked up to a live network of subscribers or a test call generator 28 may be hooked up to the switch. In either instance actual telephone calls are generated on wires connected to the switch. In the following discussion, the performance parameter being tested is the switch capacity. The invention is not limited in this regard, however, as other parameters may be measured as well.

Test call information configured to enable the test call generator to generate origination and progress messages may be programmed into the test call generator as data and computer program instructions. Alternatively, the test call information may be collected from a network and stored for later use by the test call generator. In either instance, the test call information will be referred to herein as being stored in a test call database. The database may be a classic database, containing an amalgamation of test call information, or may be a computer program or firmware or hardware implementation of a set of methods or objects from a computer program. The invention is not dependent on the manner of obtaining or generating test call information as many different methods and implementations may be used to generate test call messages. For example, optionally, the switch may be tested using live calls from subscribers by connecting the switch to a subscriber network. In this instance the live calls would be considered "test calls" since they are being used to test the capacity of the network switch using the methods disclosed herein according to an embodiment of the invention.

To test a particular switch, test calls are input to the switch. In the embodiment illustrated in FIG. 2 the test calls are generated by a test call generator, although the invention is not limited to testing a switch using test calls generated by a test call generator.

As discussed in greater detail below, according to an embodiment of the invention, the periodicity at which calls (or call messages) are transferred within the switch (the call transfer period) may be modified to simulate larger levels of test traffic. Accordingly, optionally, as shown in FIG. 2, the test call generator according to an embodiment of the invention may also include a transfer rate control module 31 configured to interact with the telephone switch to cause the telephone switch to alter the transfer period between transfers of call setup information from the call input queue to the OP queue (origination/progress queue). Alternatively, the transfer rate may be controlled by the switch itself, for example through appropriate software and hardware instantiated on the switch, e.g. in the switch's control plane. The switch control plane will be discussed in greater detail below in connection with FIG. 9.

Figure 3:
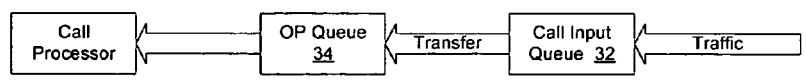
FIG. 3 is a functional block diagram illustrating the path telephone calls take in the telephone switch according to an embodiment of the invention.

FIG. 3 illustrates an example of how traffic (new telephone calls) is processed by the switch 14. For efficiency reasons, a switch will generally processes calls in batches. Accordingly, calls are received initially into an input queue 32 and stored until the processor is ready to work on them. The call input queue may be formed in shared memory 22 by the input/output processor element 20 in the embodiment of the telephone switch illustrated in FIG. 2 or in another convenient location. The calls are then read from the call input queue 32 to a queue 34 which is more readily accessible to the processor elements that will process the calls and set up the connections associated with the calls. For example, the OP queue may be contained in shared memory 22 or in local memory associated with the processor elements 24. The processor elements will then access the calls in the OP queue to establish the calls on the switch.

As mentioned above, the period of time between transfers of calls from the call input queue to the OP queue is referred to herein as the transfer period. While the transfer period is not a fixed quantity, and may vary somewhat on a given switch due to interruptions in the network processors by other programs during normal operating conditions, the transfer period for a given switch will typically remain close on average to a predetermined value, and generally is set by software instantiated on the switch. For example, the average transfer period in a conventional network switch may be set to be close to around 12.5 milliseconds (12.5 ms). Thus, whatever calls have accumulated in the call input queue between transfers (during the transfer period) are sent as a batch from the call input queue to the OP queue to be processed by the processor. The maximum capacity of the telephone switch is reached where the switch has not processed all calls in the OP queue when additional calls are transferred into the queue at the end of the next transfer period. Specifically, if there are too many calls for the processor to handle, the OP queue will remain partially full, on average, at the end of the transfer period. The extra calls will then remain in the queue and be added to the next batch of calls to be processed by the telephone switch, and so on, until memory is exhausted or there is unacceptable call processing delay for the customer. The minimum traffic volume that causes such an unbounded accumulation of work in the call progress queue during normal operation defines the maximum switch capacity.

As mentioned above, test call generators may not be able to generate sufficient test calls continuously, during a standard transfer period, to cause the call volume in the OP queue to exceed the maximum number of calls the switch is capable of processing. According to an embodiment of the invention, the apparent number of calls to be processed by the processor during a processing period is increased by inputting calls to the call input queue and extending the transfer period, but not extending the amount of time the processor has to process these calls.

In this embodiment, the transfer period is adjusted such that a longer period of time is allowed to elapse between transfers of calls from the call input queue to the OP queue. By altering the transfer period it is possible to produce an apparent call volume which is multiples of times greater than the call volume actually produced by the test call generator. This allows the behavior of the network switch to be observed as the telephone switch attempts to process the larger volumes of calls in the OP queue during a particular processing period. The processing period, in one embodiment, is not adjusted since the calls are still afforded the same priority by the network processor. Accordingly, since the priority of the calls hasn't changed, the processor will devote the same percentage of time to processing the calls as it would under normal operating conditions. Thus, the embodiment of the invention enables periods of higher call volume to be simulated so that parameters associated with the network switch capacity, such as the AWT, may be measured under these conditions.

Figure 4:
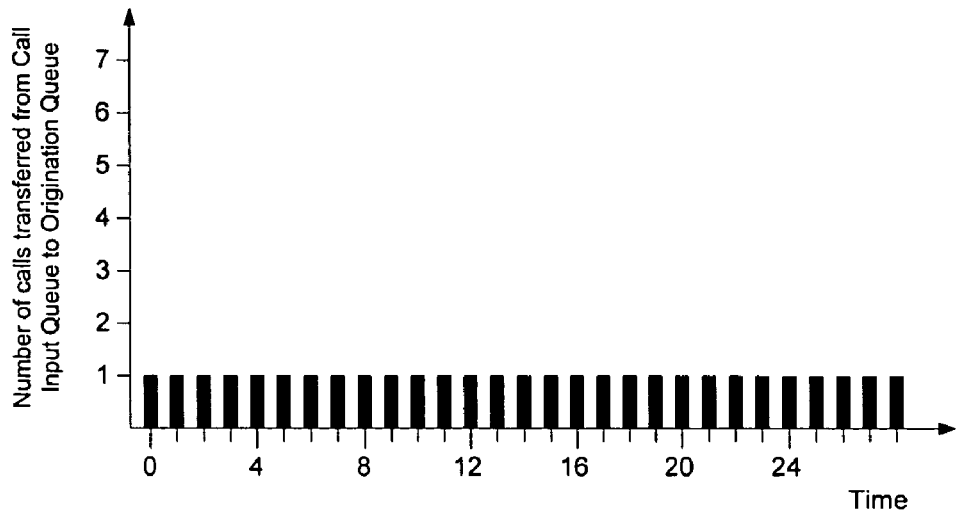
FIGS. 4–7 are graphs of the apparent number of calls in the OP queue as a function of time, as the transfer period associated with transferring the calls from the input queue to the OP queue is altered, according to an embodiment of the invention.

FIGS. 4–7 illustrate the apparent call volume as seen by the telephone switch processor via increased call volume in the OP queue as the transfer period is adjusted. FIG. 4 illustrates a scenario when the transfer period is set to 1 interval. As shown in FIG. 4, with the standard transfer period interval the test call generator is capable of generating calls at a level 1. Since the particular level of calls generated by a test call generator and the base-line transfer period are not particularly important to understanding the concepts of the invention, they have not been included on FIGS. 4–7. One example of a time period between transfers may be 12.5 milliseconds, and an average call volume that may be generated by a test call generator may be 150,000 calls per hour. The invention is not limited to values in these ranges, however, since any other values may be used as well.

In FIG. 4, calls are transferred from the call input queue to the OP queue every transfer period. The processor processes the calls in the OP queue during a processor period and, at the end of the transfer period, pulls new calls from the input queue to the OP queue. The processor period, as used herein, is the amount of time the processor would ordinarily have to process calls during normal operations. Maintaining the processor period relatively constant, for example by maintaining relative priority levels of the calls relative to other processes competing for CPU time, is advantageous in that it prevents operation of the processors from changing and thus makes the experimental results obtained according to embodiments of the invention more reliable. The invention is not limited in this manner, however, as in other embodiments the processing period may be varied as well as the transfer period.

In the examples of FIGS. 4–7, the processor period is equal to the base transfer period since the base transfer period is assumed to be associated with the transfer period of the switch during normal operating conditions. In this case the switch will be expected to process all calls in the OP queue during the transfer period. If, in this example, calls are generated by the test call generator to simulate a call rate of 150,000 calls per hour, the workload on the processor therefore will be similar to how it would be if it was receiving 150,000 calls per hour.

Figure 5:
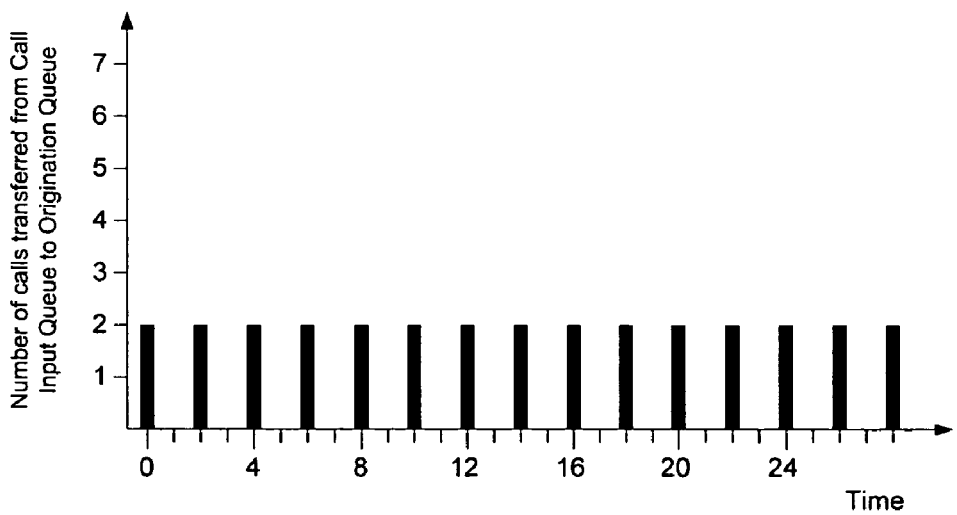

In FIG. 5, the transfer period has been increased so that calls are moved from the call input queue to the OP queue every two base transfer periods. The processor still processes the calls during one processor period (one base transfer period), however, since the processor has not been instructed to alter the priority level of call processing and has not been instructed that the transfer period has been increased. Accordingly, the processor will still think it needs to process all calls in the OP queue during the standard processing period which, as discussed above, is the same as the base transfer period. Thus, the number of calls in the call input queue, and hence input to the OP queue, is twice as large as that of FIG. 4 since twice as many calls have been allowed to accumulate in the call input queue before the calls are transferred to the OP queue. Accordingly, the processor will experience a call volume twice as large as in FIG. 4 even though the test call generator has input calls to the telephone switch at the same rate in both instances.

In the example of FIG. 5, assuming that the test call generator is generating calls and inputting test calls not the call input queue at a rate of 150,000 calls per hour, the processor will experience a call volume equivalent to 300,000 calls per hour for those transfer periods where there are calls in the OP queue and a call volume equivalent to approximately 0 calls per hour for those periods where there are no calls in the call OP queue. The behavior of the switch processor remains fairly constant for situations where the switch is not at capacity, since the switch in non-capacity operations will generally process all of its calls from the OP queue before any new calls are transferred to the OP queue. Thus, the relatively longer periods of inactivity between call transfers from the call input queue to the OP queue should have marginal impact on the processor's ability to process calls when calls are ultimately placed into the OP queue. If calls remain in the OP Queue after one base transfer period (after one processor period) it is possible to conclude that the capacity of the switch has been reached. Accordingly, by measuring the AWT at this rate it is possible to determine the capacity of the switch.

Figure 6:
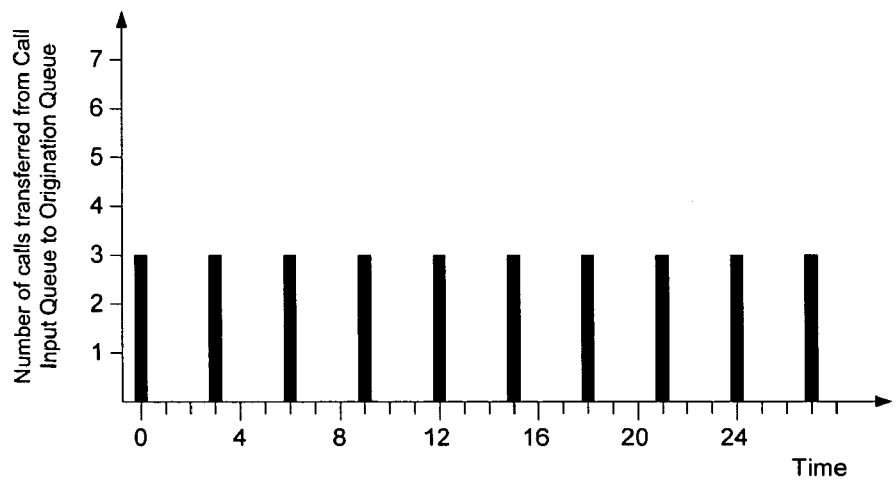
Figure 7:
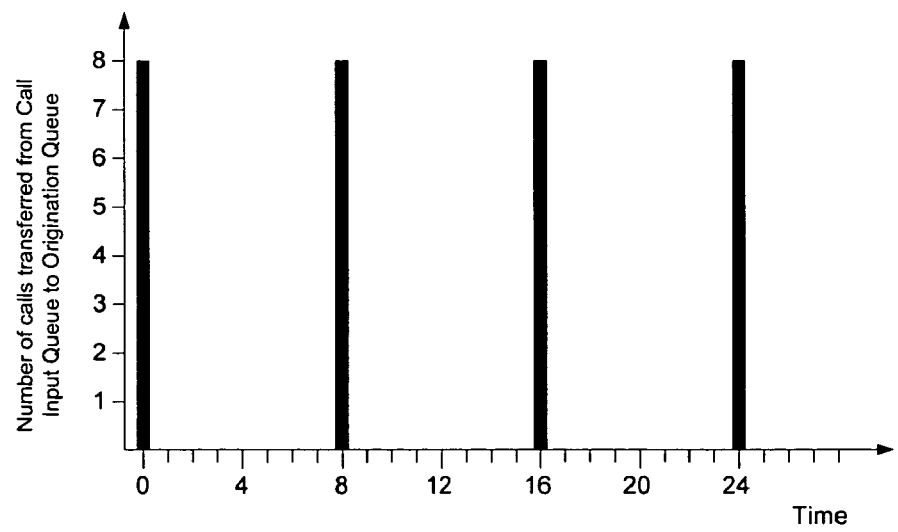

FIG. 6 illustrates an example in which the transfer period has been increased such that calls are moved from the call input queue to the OP queue every three transfer periods. Similarly, FIG. 7 illustrates an example in which the transfer period has been increased such that calls are moved from the call input queue to the OP queue every eight transfer periods. In these two examples, assuming once again that the test call generator generates calls at a rate of 150,000 calls per hour, the effective rate apparent to the call processor for those periods when calls are transferred to the OP queue will be 450,000 calls per hour (3 times 150,000 calls per hour) and 1,200,000 calls per hour (8 times 150,000 calls per hour). Thus, as illustrated by FIGS. 4–7, the number of calls placed in the OP queue, and hence the call rate as seen by the processor elements, may be adjusted by altering the rate at which calls are transferred from the call input queue to the OP queue. This may be done, as discussed above by altering the transfer period while maintaining the same level of test call generation. This allows a test call generator with a relatively low test call generation capacity to be used to ramp switch traffic to much higher levels to thereby test the capabilities of the switch to handle calls at the higher levels.

Figure 8:
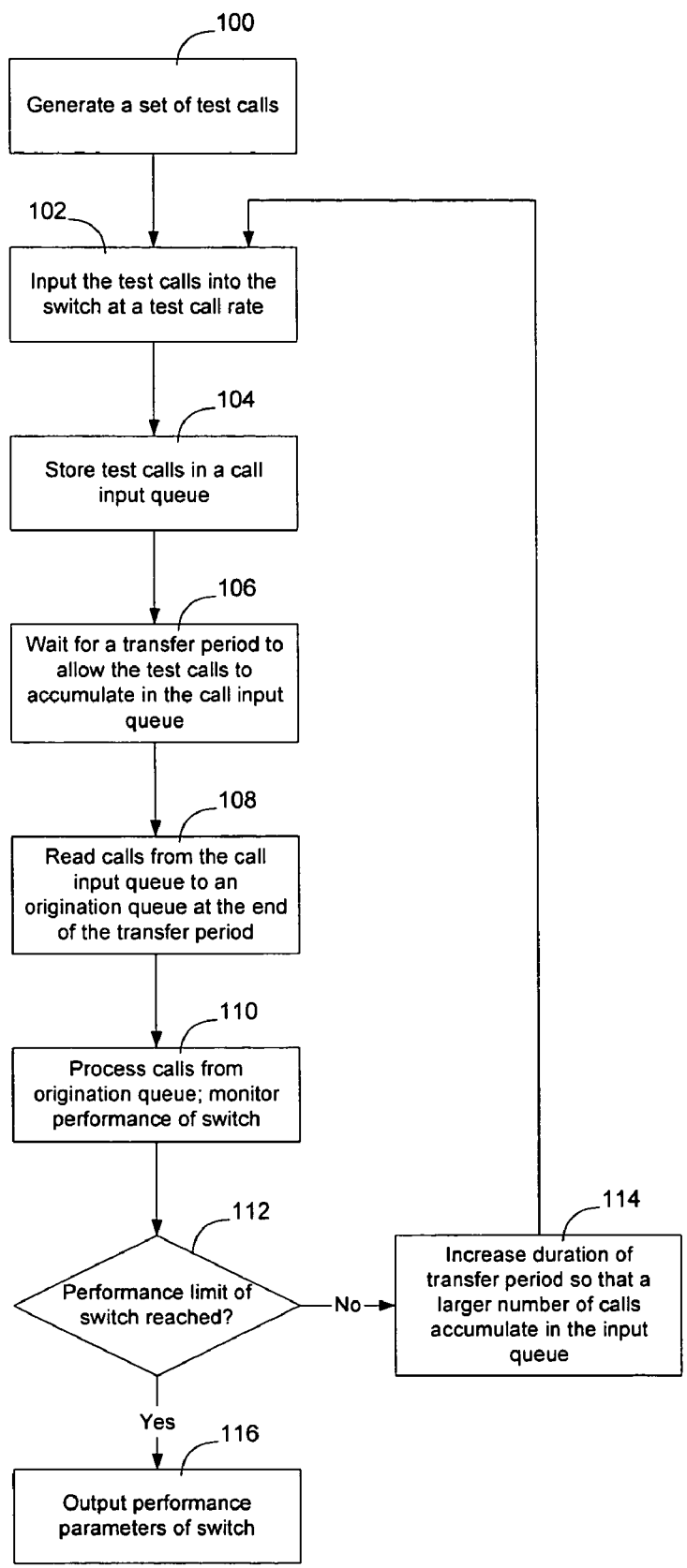
FIG. 8 is a flow diagram illustrating a process of testing a switch by altering the transfer period according to an embodiment of the invention.

FIG. 8 illustrates a flow chart of a method of using the techniques disclosed herein to test the capacity of a switch according to an embodiment of the invention. This method may be implemented in software, hardware, firmware, or any combination thereof. Different portions may be performed by different system components and the invention is not limited to implementation in a single physical or logical network device. As shown in FIG. 8, to input calls to a switch and test its ability to process those calls, it is first necessary to have access to a set of test calls. The set of test calls may be generated by a call simulation program, may be stored from a record of actual calls, or may be generated as actual telephone calls. However the set is generated (100), the set or a subset of the set of test calls are input at a particular rate to the switch to be tested (102). The rate may be constant, may vary, or the calls may be input in any number of predefined patterns. For the purposes of this description it will be assumed that the calls are input at a relatively constant rate when viewed on a relatively large time scale. This rate will be referred to herein as the "test call input rate."

The test calls input at the test call input rate are stored in the switch in a call input queue (104). As described above, a switch will generally allow calls to build up in the call input queue and periodically transfer these calls to a more accessible memory area, such as an OP queue. As shown in FIG. 8, the test calls will continue to accumulate in the call input queue until it is time to transfer the calls (106), at which time the calls will be transferred from the call input queue into the telephone switch's OP queue (108).

Once the calls are in the OP queue, the switch will process the calls (110) and various processing parameters will be monitored. One such parameter that may be monitored is the average working time, although other parameters may be monitored as well. It is then determined if the performance limit of the switch has been reached (112). One way of ascertaining if the performance limit of the switch has been reached is to see if all the calls from the OP queue have been processed within a period of time approximately equal to the average period of time the processor takes between retrieving calls from the call input queue during normal operating conditions. Although the transfer period is being altered by the methods of the invention to enable higher call volumes to build up on the call input queue, under normal operating conditions the switch would be required to process all calls from its OP queue within an average processing period. When the number of calls on the OP queue exceeds the number of calls that are able to be processed by the switch within the average processing period, the switch has reached its capacity. By ascertaining the number of calls processed during the average processing period it is possible to determine the average working time (AWT) of the switch at capacity. This is an actual measured value. This actual measured value can be used to directly calculate the number of calls that may be processed by a switch in a given time period, such as the number of calls per hour.

If the performance limit of the switch has not been reached, the transfer period is increased (114) so that a larger number of calls may be caused to accumulate in the input queue prior to being transferred to the OP queue. The process then iterates with longer transfer periods and concomitant larger numbers of test calls until the performance limit of the switch has been reached (116). Once the performance limit of the switch has been reached, the performance parameters of the switch may be output. Example output parameters include the average working time, the maximum number of calls the switch may be expected to handle in a given time period, and many other parameters such as the "average message working time," and the OP delay experienced by the caller Although this embodiment has been described as watching for the maximum capacity of the switch to be reached, another way of measuring the maximum capacity of the telephone switch is to increase the number of calls on the OP queue using the transfer period alteration techniques discussed above, and monitor the AWT for the switch at the different levels. As the switch approaches its maximum capacity level, the AWT should stabilize at a particular level. Then, once the maximum of the switch has been exceeded, the AWT should not vary with increasing numbers of calls on the OP queue. By monitoring the AWT and finding the value where the AWT ceases to change with increasing call volume, the AWT at capacity may be measured. The measured AWT may be used to directly or indirectly calculate the maximum number of calls the switch can be expected to handle under standard operating conditions. There are many ways of using the data that may be obtained by using the techniques disclosed herein and the invention is not limited to any particular technique of using the data to obtain performance parameters of the switch.

Additionally, although the invention has been described herein as being used to measure the capacity of a switch, the invention is not limited to an embodiment that measures capacity, as the invention may be more broadly used to measure other performance-related aspects of the switch. For example, other performance-related aspects that may be measured include whether there is any blocking by the switch, especially in a multi-processor switch scenario, whether the switch exhibits any channel-blocking conditions, the amount of time the switch spends performing other non-call related processes, and other switch performance matrices. Accordingly, the invention is not limited to use of the method to measure switch capacity.

Figure 9:
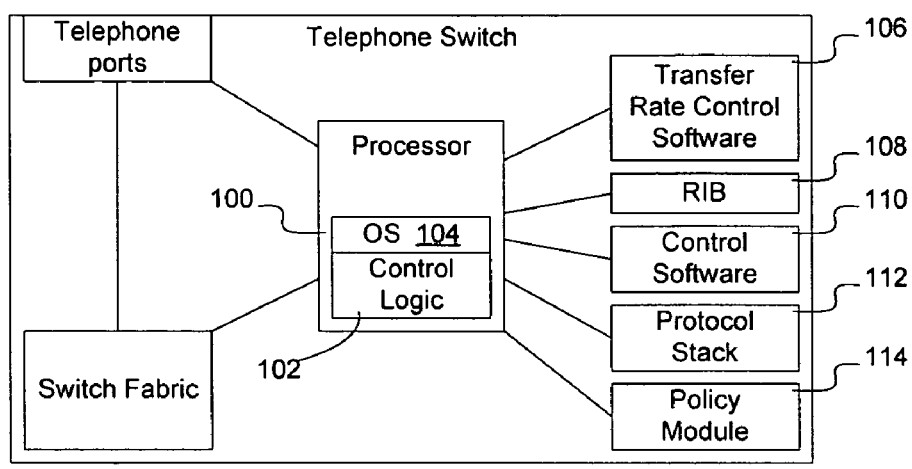
FIG. 9 is a functional block diagram of a control plane of a telephone switch according to an embodiment of the invention.

FIG. 9 illustrates a functional block diagram of one embodiment of a control plane of a telephone switch 100 configured to implement the functions ascribed to it above in connection with FIGS. 1–8. As shown in FIG. 9, the telephone switch includes a processor 100 having control logic 102 configured to implement the functions ascribed to it as described above in connection with FIGS. 1–8. Operating system software 104 is instantiated on the processor 100 to enable it to perform scheduling, interrupt, and other typical operating system functions. Transfer rate control software 106 is also instantiated on the processor to enable it to control the transfer rate at which calls are transferred from the call input queue to the OP queue at least under test conditions.

The telephone switch may also include various conventional software modules, such as a telephone call routing information base 108, a control software module 110, a protocol stack 112 containing instructions and data relevant to communications protocols such as SS7, and a policy module 114 to enable the network operator to affect policy decisions on the switch. Numerous other software modules may be included as well and the invention is not limited to a network switch including all or any of these additional software modules.

The control logic 102 may be implemented as a set of program instructions that are stored in a computer readable memory within the network element and executed on a microprocessor, such as processor 100. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for testing the performance of a network switch, comprising:
    inputting first calls to a first queue;
    transferring the first calls after a first transfer period to second queue for processing by a network switch processor; and
    generating a second transfer period longer than the first transfer period.

2. The method of claim 1, wherein the first calls are test calls, wherein inputting the first calls occurs at a test call transfer rate.

3. The method of claim 2, wherein the first calls comprise origination messages and progress messages.

4. The method of claim 1, further comprising processing the first calls from the second queue during a first processing period, the first processing period being independent of the first transfer period and independent of the second transfer period.

5. The method of claim 4, further comprising inputting second calls to the call input queue during the second transfer period, and transferring the second calls after the second transfer period to the second queue for processing by the network switch processor.

6. The method of claim 5, further comprising processing the second calls during a second processing period, said second processing period being approximately equal to the first processing period.

7. The method of claim 6, wherein the second transfer period is much longer than the first transfer period.

8. The method of claim 6, wherein the first calls are test calls, the second calls are test calls, wherein inputting the first calls occurs at a test call transfer rate, and wherein inputting the second calls occurs at the test call transfer rate.

9. The method of claim 8, wherein a larger number of second calls accumulates on the first queue during the second transfer period than accumulate on the first queue during the first transfer period.

10. The method of claim 1, wherein the first queue is a call input queue and the second queue is an Origination/Progress (OP) queue.

11. The method of claim 1, wherein testing the performance of the network switch comprises testing at least one network switch performance parameter, and wherein the network switch performance parameter is a capacity of the switch.

12. A telephone switch, comprising
    a call input queue configured to receive call setup information;
    an Origination and Progress (OP) queue configured to receive call setup information transferred from the call input queue and to store the call setup information; and
    at least one call processor configured to process the call setup information from the OP queue;
    wherein the call setup information is configured under normal operating conditions to be transferred from the call input queue to the OP queue periodically approximately every base transfer period; and
    wherein the call setup information is configured under test operating conditions to be transferred from the call input queue to the OP queue periodically approximately every transfer period, said transfer period being longer than said base transfer period.

13. The telephone switch of claim 12, further comprising transfer rate control software configured to adjust the transfer period.

14. The telephone switch of claim 12, wherein the transfer period is at least twice as long as the base transfer period.

15. The telephone switch of claim 12, wherein the processor is configured to process call setup information within a processing period.

16. The telephone switch of claim 15, wherein the processing period under normal operating conditions is the same as the processing period under test operating conditions.

17. The telephone switch of claim 12, wherein the transfer period is approximately a multiple of the base transfer period.

18. The telephone switch of claim 12, wherein the call setup information comprises call origination messages and call progress messages.

19. A test call generator, comprising:
- means for generating test call information;
- means for outputting the test call information from the test call database to a telephone switch at a test call rate; and
- a transfer rate control module configured to interact with the telephone switch to control how the telephone switch handles the test calls.

20. The test call generator of claim 19, wherein the transfer rate control module is configured to simulate on the telephone switch a switch call rate larger than the test call rate.

21. The test call generator of claim 19, wherein the transfer rate control module is configured to control a transfer period on the telephone switch between a call input queue on the telephone switch and an Origination and Progress (OP) queue on the telephone switch.

* * * * *